United States Patent [19]

Tomazic

[11] Patent Number: 5,391,973
[45] Date of Patent: Feb. 21, 1995

[54] METHOD OF CHARGING A MULTIPLICITY OF BATTERIES

[75] Inventor: Gerd Tomazic, Murzzuschlag, Austria

[73] Assignee: S.E.A. Studiengesellschaft für Energiespeicher und Antriebssysteme Gesellschaft mbH, Steiermark, Austria

[21] Appl. No.: 887,054

[22] Filed: May 22, 1992

[30] Foreign Application Priority Data

May 24, 1991 [AT] Austria .................. A1062/91

[51] Int. Cl.⁶ ............................ H02J 7/00
[52] U.S. Cl. ........................ 320/21; 320/2; 320/16; 320/17
[58] Field of Search ............ 320/2, 16–21, 320/57

[56] References Cited

U.S. PATENT DOCUMENTS

| | | | |
|---|---|---|---|
| 3,305,754 | 2/1967 | Oaks et al. | 320/37 |
| 3,886,426 | 5/1975 | Dagget | 320/7 |
| 3,926,673 | 12/1975 | Saridakis | 136/31 |
| 4,331,911 | 5/1982 | Park | 320/17 |
| 4,482,614 | 11/1984 | Zito | 429/70 |
| 4,616,170 | 10/1986 | Urstöger | 320/18 |
| 4,670,703 | 6/1987 | Williams | 320/21 |
| 4,782,279 | 11/1988 | Selanger | 320/2 |
| 4,849,682 | 7/1989 | Bauer et al. | 320/19 |
| 5,003,244 | 3/1991 | Davis | 320/17 |
| 5,153,496 | 10/1992 | La Forge | 320/17 |

FOREIGN PATENT DOCUMENTS

| | | |
|---|---|---|
| 0135056 | 3/1985 | European Pat. Off. . |
| 0149448 | 7/1985 | European Pat. Off. . |
| 0167517 | 1/1986 | European Pat. Off. . |
| 0168377 | 1/1986 | European Pat. Off. . |
| 0207057 | 12/1986 | . |
| 0223768 | 5/1987 | European Pat. Off. . |
| 0225315 | 6/1987 | European Pat. Off. . |
| 0228361 | 7/1987 | European Pat. Off. . |
| 0277937 | 8/1988 | European Pat. Off. . |
| 0291496 | 11/1988 | European Pat. Off. . |
| 0327528 | 8/1989 | European Pat. Off. . |
| 0343144 | 11/1989 | European Pat. Off. . |
| 0434659 | 6/1991 | European Pat. Off. . |
| 0438044 | 7/1991 | European Pat. Off. . |
| 0479765 | 4/1992 | European Pat. Off. . |
| 2028117 | 12/1970 | Germany . |
| 3811371 | 10/1989 | Germany . |

*Primary Examiner*—Steven L. Stephan
*Assistant Examiner*—Thomas M. Dougherty
*Attorney, Agent, or Firm*—Sandler, Greenblum & Bernstein

[57] ABSTRACT

A method is provided for charging a multiplicity of electrochemical storage, such as cells, cell stacks, and/or batteries. For each storage aqueous electrolytic liquids are infed and outfed at least periodically, or continuously, to and from individual anode and cathode spaces in hydraulic parallel circuits. During the charging of each storage, metallic zinc is separated at the cathode as a layer and bromine is separated at the anode which is converted by a complex former dissolved in aqueous electrolyte into a complex which is essentially insoluble in water. Each electrolyte liquid is provided with a separate circuit, a separate supply container, and also pumps. During the charging operation, at a predetermined time intervals the charging state of each of the electrochemical storage is determined, and upon reaching a predetermined value of the charging state of the corresponding electrochemical storage, the charging operation thereof is interrupted.

19 Claims, 1 Drawing Sheet

METHOD OF CHARGING A MULTIPLICITY OF BATTERIES

CROSS REFERENCE TO RELATED APPLICATION

This application is related to the commonly assigned, copending U.S. application Ser. No. 07/887,048, filed on May 22, 1992, and entitled "Method Of Determining The Charging State Of A Zinc-Bromine Battery And Method Of Charging Such Battery", to which reference may be readily had and the disclosure of which is incorporated herein in its entirety by reference.

BACKGROUND OF THE INVENTION

1. Field of the Invention

The present invention relates to a new and improved method of charging a multiplicity of electrochemical storages, namely, cells, cell stacks, and especially batteries.

Generally speaking, the method of charging a multiplicity of storages, such as batteries, as contemplated by the present development, is of the type where, for each battery, there is at least periodically, although preferably continuously, infed and outfed aqueous electrolytic or electrolyte liquids to and from the individual anode spaces or chambers and cathode spaces or chambers the storages.

2. Discussion of the Background and Material Information

Electrical energy can be converted, with exceptionally high efficiency, into thermal energy and kinetic energy. Thus, a wide field of application is available for the employment of electrical energy in stationary systems or immobile equipment. The advantage of the ease of energy conversion, especially electrical energy into kinetic energy, in the case of mobile systems or equipment, is mitigated by the poor storage capacity of mobile energy storages or accumulators. If batteries are employed in mobile systems, such as, for example, motor vehicles, then it is desired that each electrical energy supply or storage unit possess as low weight as possible, in order to maintain as small as possible the energy expenditure needed for the transport of the storage unit or accumulator. Furthermore, in order to maximize the possible field of application, it is necessary that the stored quantity of current be optimized, in order to maximize the possible travel range of an electrically powered vehicle. For instance, this stored quantity of electrical energy should be great enough so that the vehicle can travel the distance usually travelled in one day by the vehicle, so that during those times that the vehicle is not used for travel its battery can be recharged.

In addition, as concerns many different stationary systems or consumers, it is necessary to have available a minimum amount of current or electrical energy. By providing a minimal amount of current or energy, in the event of power failure of the mains or network, further operation of the stationary energy consumers or loads can be ensued. Stationary energy storage units or accumulators are of particular interest for use, and for example, in hospitals as emergency power supplies, for emergency lighting, as electrical storages for normal operation of equipment powered by discontinuously operating energy conversion systems such as, for instance, solar energy, wind energy, tidal power plants and so forth.

These energy storages should possess as great as possible electrical potential, so that there is afforded high efficiency, and furthermore, in order to realize a particularly simple utilization thereof.

The electrical capacity of a battery is directly dependent upon the quantity of available electrolyte. In the case of a zinc-bromine battery, for instance, as described in the commonly assigned European Published Patent Application No. 0,327,528, published Aug. 9, 1989, to which reference may be readily had and the disclosure of which is incorporated herein in its entirety by reference, a circulating electrolyte system is used for increasing the quantity of electrolyte. During charging of the battery, there is separated at the cathode a zinc film which is as uniform as possible, and at the same time bromine is separated at the anode. In conjunction with a complex former provided in the aqueous electrolyte, this bromine forms a bromine complex which is exceedingly difficult to dissolve in the essentially aqueous electrolyte, so the bromine, just like the zinc, can have delivered a storage thereto. Due to the fact that the bromine complex is essentially insoluble in the aqueous phase, there is formed a suspension, and in the container or receptacle of the anode electrolyte there is separated at the floor thereof the bromine complex. The upper capacity limit of such type battery is thus defined by (1) the cathode space or chamber, and specifically, the possibility of separating the quantity of zinc, and by (2) the storage capacity of the supply vessel for the electrolyte or electrolytic liquid. The capacity or power removal, in other words, the removal or drawing of current per unit of time, is primarily dependent upon the electrode surface. The electrical potential of such battery type is dependent upon the number of cells connected in series. In order to provide as similar as possible electrochemical conditions, circulating electrolyte or electrolytic liquids are delivered to the cathode and anode spaces or chambers of a battery connected in hydraulically parallel circuits. As a result, there is afforded a uniform concentration of all constituents of the electrolyte, and furthermore, there can be obtained a uniform temperature, something which is likewise of utmost importance.

Circulating electrolyte systems bring about, on the one hand, an increase in the battery capacity, but, on the other hand, with an increase in the number of the electrodes connected in series, that is, with increasing potential, stray or vagabond currents flowing through the electrolyte liquid which, particularly in the case of greater electrical potentials, result in a continuous discharge of the battery. This battery discharge is not only present during inactive times of the battery, but also when current is drawn therefrom. In order to prevent excessive current loss, it is known to interconnect the individual electrolyte chambers or spaces by means of a conductor or line of the second order which has a resistance which varies from cell to cell. A most simple construction entails interconnecting the electrolyte chambers by a connection channel having decreasing and again increasing cross-sectional area. However, such compensation of stray currents is associated, on the one hand, with energy expenditure and, on the other hand, also with continual energy consumption even during the times of preparing the battery for functioning thereof. The currents prevailing in the battery partially cause a dissolving and renewed separation of the zinc film, so that even when storing the charged battery there can arise considerable capacity losses.

In order to prevent these unwanted currents, it has been proposed in the commonly assigned European Published Patent Application No. 0,168,377, published Jan. 15, 1986, to suppress, during the inactive times of the battery, the hydraulic connection between the individual cathode and anode spaces or chambers by using appropriate shutoff elements, such as cocks, slide valves and the like. It then is possible, during such inactive or inoperative times of the battery, to ensure that current is not internally consumed by the battery. However, it is not possible to prevent recharging within the battery or when a number of batteries are connected in series recharging between the batteries during current removal.

In order to ensure as uniform as possible charging of batteries and partial electrode stacks or packets, such can be connected in parallel for charging the same, and they can be connected in series for the removal of operating current and to maintain the electrical potential as high as possible.

SUMMARY OF THE INVENTION

Therefore, with the foregoing in mind, it is a primary object of the present invention to provide an improved method of charging a multiplicity of storages which is not afflicted with the aforementioned shortcomings and drawbacks.

Another and more specific object of the present invention aims at providing an improved method of charging a multiplicity of electrochemical storages or accumulators, in particular cells, cell stacks, especially batteries, wherein both during charging and also during removal of electrical energy losses are avoided due to mutual charging and discharging of individual cells, cell stacks and batteries, respectively.

In order to implement these and still further objects of the present invention, which will become more readily apparent as the description proceeds, the electrochemical storage charging method of the present development contemplates that, at each storage, aqueous electrolytic or electrolyte liquids are fed at least periodically, or at all times or continuously, to and from the individual anode and cathode spaces or chambers in a hydraulic parallel circuit, and during charging there is separated at the cathode as a layer, and at the anode, bromine is seperated The bromine is converted into a complex difficult to dissolve in water by a complex former, for example, morpholine derivative, dissolved in aqueous electrolyte. For each electrolyte liquid, there is provided a separate circuit and separate supply container, and also pumps. According to important aspects of the present invention, during the charging operation at predetermined time intervals the charging state of the individual and/or singled electrochemical storages is determined, and upon reaching a predetermined value of the charging state the charging operation of the corresponding electrochemical storage.

Cells containing a cathode and an anode and an intermediately connected diaphragm or separator form the smallest unit of a battery, and recharging can occur already between the individual cells when a circulating electrolyte system is present. Such recharging is especially brought about when unequally or irregularly dimensioned cells are present, for example, internal resistances and the like. The expression "individual cell stacks" as used herein, means a plurality of individual cells which are connected in series and also can be at least conjointly charged in series. For this purpose, for example, both at the start and at the end of a cell stack, there is provided an additional or supplementary electrode which serve for the infeed and outfeed of current. The term "battery" as used herein, means a plurality of galvanic cells which conjointly possess an anode electrolyte and cathode electrolyte circulation system or circuit in which, in each case, there is provided a conveying element, for example, a pump. At each of the corresponding end or terminal electrodes there is provided an electrical infeed line and outfeed line, and at an electrode between these infeed and outfeed lines there can be provided a further electrical connection. As will be apparent from the foregoing explanations, the primary difference between galvanic cells and cell stacks resides in the fact that cell stacks comprise a plurality of galvanic cells. Furthermore, the primary difference between cell stacks and batteries resides in the fact that although cell stacks contain common electrical infeed and outfeed lines, batteries comprise both electrical infeed and outfeed lines as well as their own or separate electrolyte infeed and outfeed systems to the individual electrode chambers with their own or separate supply vessels and own conveying elements, for example, pumps.

Owing to the fact that during the charging of the electrochemical storage or accumulator (that is, the individual cells or cell stacks, especially batteries) the charging state thereof is checked and upon reaching a predetermined charging state the charging operation is interrupted, there can be attained in a particularly simple and effective manner an identical charging state of the individual storages. As a result, recharging and the thus caused electrochemical losses are prevented in a particularly simple manner. More intensified recharging operations occur at zinc-bromine batteries having circulating electrolyte systems at approximately 30 to 40 volts, so that either such type batteries or cell stacks are preferably employed when practicing the inventive method. The recharging operations also can arise due to differences in the separators, the self-discharge and the like.

There can be achieved a particularly simple charging method if, during a charging operation, the storages are electrically connected in parallel, so that each storage can be disconnected from the charging operation. With such a procedure there can be especially easily obtained an identical charging potential or voltage and current intensity for storages theoretically provided with the same potential, and there can be taken into account in a particularly advantageous fashion the differences of the stochastically occurring charging states due to disconnection of the individual storages.

If the charging state of the individual or separated storages is determined by carrying out current measurements thereat, these current measurements being undertaken, for instance, under a predetermined loading or load. The charging state can then be ascertained in a particularly simple manner, especially in the case of zinc-bromine batteries.

If charging of the storages is accomplished by means of a common primary winding of an electrical transformer and secondary windings equipped with rectifiers associated with individual storages, then output or power fluctuations or changes of the mains or primary network can easily be taken into account the need for an increased measuring expenditure, and thus, an increased time expenditure at the individual electrochemical storages.

If, for the purpose of determining the charging state, the electrical connection is interrupted to the charging current source of all storages, e.g., by means of a switch for each storage, and the charging state of the individual storages is determined, then there can be checked in an exceedingly time-extensive fashion, the charging state of the individual storages and there can be accomplished at the same instant of time a matching of the storages as concerns their capacity.

In the event the electrolyte liquids are maintained in circulation during the determination of the charging state, then it is possible to take into account, in an exceedingly effective manner, a parameter which can be varied within limits during such determination. Even during measuring operations extending over longer time periods, false indications of the actual charging state do not arise.

If a memory metal or memory alloy which is heated, especially electrically heated, is used for actuation of the switch, then there can be accomplished switching operations at high switching rates with particularly low energy requirements.

When respective switches are provided, and assume a position in which the electrochemical storages are connected in series, then with the same switches there can be carried out both the charging operation and also the drawing or removal (discharge) of the electrical energy at high electrical potentials.

If a switch is provided with a memory alloy, and the memory alloy of the switch is heated during charging, especially electrically heated, upon the completion of the charging operation, and thus, at the end of the heating of the memory-type switching element or switch, a switching operation can easily be performed, such as switching the individual storages from parallel to series, so that the switching energy is taken from the mains or network and not from the storage.

If the sequence of electrically series connected electrical storages, cell stacks and/or batteries (e.g. as shown in FIG. 3) is altered, so that at two storages (e.g., The electrical infeed and outfeed lines which were connected with the consumer or load are connected with one another, and the other electrical infeed and outfeed lines which were connected with one another are connected with the electrical consumer or load, then a different potential or voltage distribution will be present, and thus, a different current flow in the electrolyte infeed and outfeed lines or conduits, will be present so that undesired zinc deposits or the like can be dissolved. Instead of the electrical consumer or load, the charging device can also be switched, whereby there is then achieved the advantage that the recharging currents emanate from the mains or network, resulting in an additional increase in the capacity of the batteries.

BRIEF DESCRIPTION OF THE DRAWINGS

The invention will be better understood, and objects other than those set forth above will become apparent when consideration is given to the following detailed description thereof. Such description makes reference to the annexed drawings wherein.

DETAILED DESCRIPTION OF THE PREFERRED EMBODIMENTS

Describing now the drawings, it is to be understood that only enough of the construction of the electrochemical storage and the like and associated equipment have been depicted therein, in order to simplify the illustration, as needed for those skilled in the art to readily understand the underlying principles and concepts of the present invention.

Figure 1:
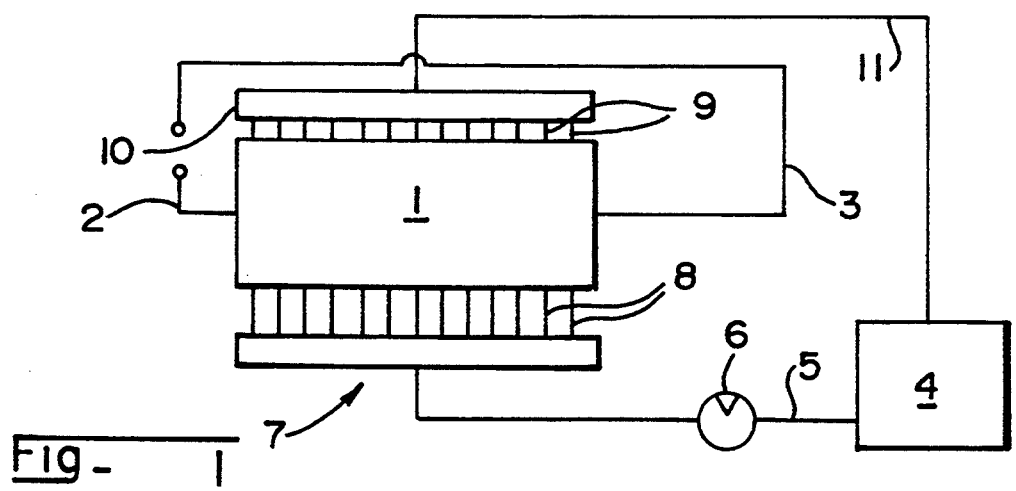
FIG. 1 schematically illustrates an electrochemical storage equipped with infeed and outfeed lines or conduits for an electrolytic liquid.

Turning attention specifically to FIG. 1, an electrochemical storage or accumulator 1 constituted by a battery is provided which is constructed from a multiplicity of conventional, and thus not illustrated, bipolar electrodes. These electrodes comprise an intermediate portion formed of carbon-bound plastic surrounded by a non-conductive electrical plastic. This edge, in turn, is welded with diaphragms or separators arranged between the electrodes form of plastic, resulting in the formation of cathode electrolyte and anode electrolyte spaces or chambers. The relevant end or terminal electrodes comprise collectors through which the current is removed and then can be delivered to a consumer or load by means of the lines or conductors 2 and 3. In order to simply the illustration, there has merely been shown one hydraulic circulation circuit, although it is to be understood that for each storage 1 such a circulation circuit is provided both for the anode electrolyte and the cathode electrolyte. Basically, such type of a zinc-bromine battery has been disclosed in greater detail in the commonly assigned European Patent No. 0,149,448, published Jul. 24, 1985, to which reference may be readily had and the disclosure of which is incorporated herein in its entirety by reference.

By means of a line or conduit 5 and pump 6, electrolyte is supplied from a supply container or receptacle 4 to a slide (or slide valve 7 or equivalent structure) which also simultaneously defines a collector from which the electrolyte liquid is distributively infed into the individual electrode spaces or chambers. This electrolyte infeed is accomplished by lines or conduits 8. On the other hand, lines or conduits 9, a slide or slide valve 10 or equivalent structure simultaneously forming a collector, and an outfeed line or conduit 11 serve to outfeed or remove of the electrolyte from the individual electrode spaces or chambers. The electrolyte or electrolytic liquid is maintained in circulation by the pump 6 both during charging, discharging, checking of the charging state, and current removal. During charging, zinc and bromine are separated out at the relevant electrodes. The zinc forms a covering or film which adheres to its associated electrode. On the other hand, the bromine is converted by a complex former dissolved in the aqueous electrolyte into a complex which is difficult to dissolve in water, which can be suctionally removed from and introduced into the electrode chambers in the form of an aqueous suspension. Quaternary ammonium salts, for example, pyrrolidinium salts and the like, have proven useful as complex formers.

Figure 2:
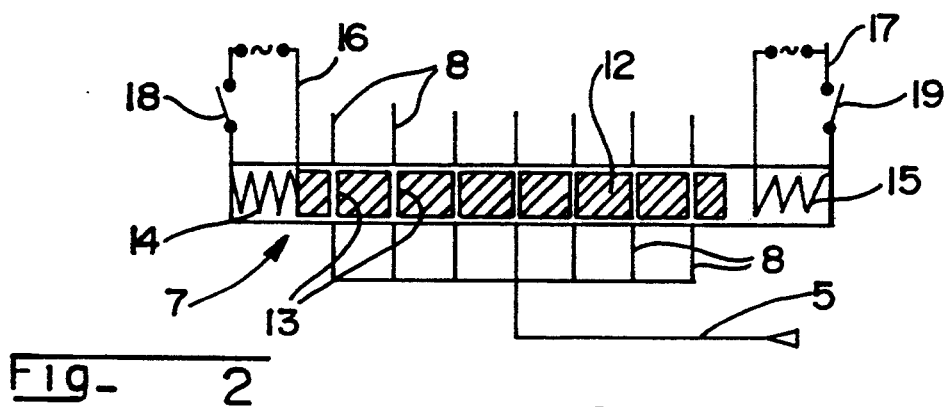
FIG. 2 schematically illustrates, partially in section, details of a slide valve or slide control used in the arrangement of FIG. 1.

The slide 7 depicted in FIG. 2 is provided with a line or conduit 5 which is divided into branch lines or conduits 8 which lead to the individual electrolyte spaces or chambers. A closure element 12 is provided in the slide 7 and contains bores 13 which, when open, interconnect the lines 8. The slide 7 can be operated by means of suitable resilient or biasing elements, such as springs 14 and 15 formed of a suitable memory alloy and provided with electrical heating circuits 16 and 17 and switches 18 and 19, respectively. As is well known, memory alloys have the capability of assuming their original shape at a certain or predetermined temperature which advantageously does not coincide with room temperature. If a spring formed of a memory alloy is heated, then this spring assumes its original shape, so that the shutoff or closure element can be appropriately shifted as a function of closing of the switches 18 and 19.

A switch for the electrical connections, and specifically, charging by means of the secondary current circuits of a transformer, measuring the charging state, complete interruption of the electrical connections and connecting in series the individual electrical storages, can be analogously constructed from memory alloy switches.

Figure 3:
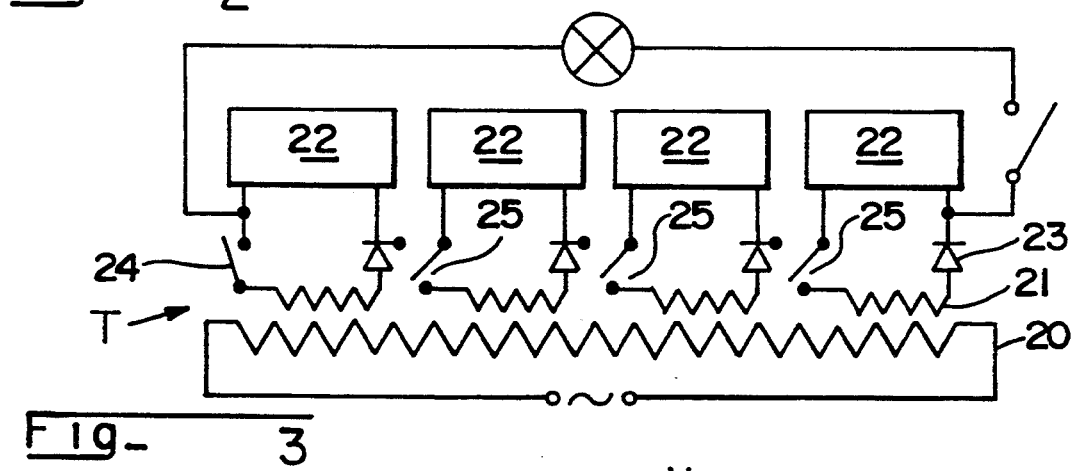
FIG. 3 illustrates an electric circuit diagram of the electrochemical storage.

In the schematic electric circuit diagram of FIG. 3, secondary windings 21 are arranged in cooperative relationship with the primary winding 20 of a transformer T. For charging each electrochemical storage 22 there is necessary current rectification by means of an associated rectifier 23. As shown, switches 24 and 25, respectively, are provided for the secondary windings 21 defining secondary current circuits. With the exception of the switch 24 which only assumes an on/off-position, the switches 25 have two switch positions, wherein, in one switch position the charging current circuit can be closed and in the other switch position there is accomplished a series connection of the electrochemical storages.

Figure 5:
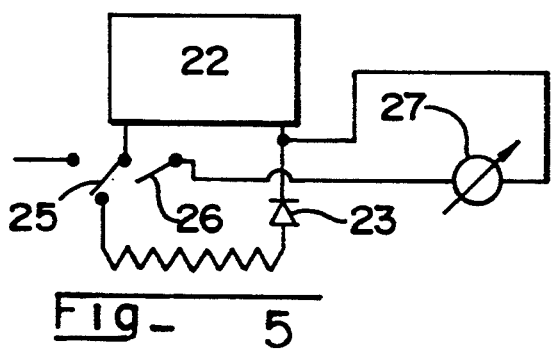
FIG. 5 schematically illustrates an electrochemical storage equipped with electrical potential or voltage measuring device.

FIG. 5 illustrates the provision of a further switch 26 serving to connect a voltmeter 27 or equivalent device with the electrochemical storage 22, so that the momentary charging state can be checked.

Figure 4:
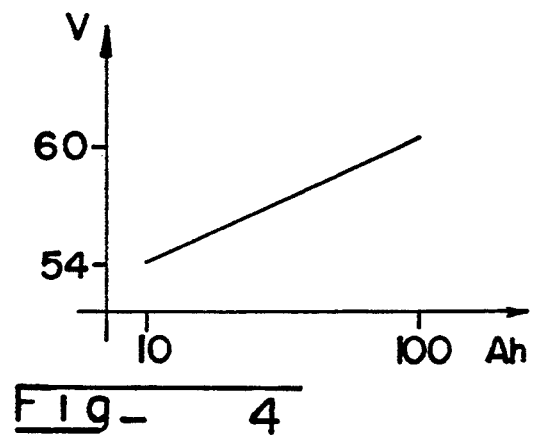
FIG. 4 is a diagram illustrating the dependency of the charging state and the potential or voltage of an electrochemical storage.

FIG. 4 depicts the correlation between potential or voltage and the charging capacity. In the case of an electrochemical storage with 100 ampere-hours, at a certain current load, the potential or voltage, at a 10% charge, climbs from 54 volts to 58.75 volts with 80% charging capacity. The charging capacity also can be determined in a different manner. Thus, for example, the reduction in the conductivity of the electrolyte liquid due to reduction of the zinc ions in the electrolyte, constitutes a measurement magnitude. However, there also can be determined, for instance, the quantity of the formed bromine complex in the supply container for the electrolyte, for example, with the use of suitable floats.

During the charging of the electrochemical storages, the procedure undertaken is to charge identical electrochemical storages by means of the transformer T having the primary winding 20 and the multiplicity of secondary windings 21. At predetermined time intervals, which can decrease with increasing charging state of the electrochemical storages, determination is made of the potential or voltage of the individual electrochemical storages. If the potential of one or more of the electrochemical storages exceeds 5% of the arithmetic mean value of all electrochemical storages, then the charging of such electrochemical storage is interrupted, in order to initiate a balancing of the charging capacity of the other electrochemical storages. During the next checking of the charging capacity, a charge is again delivered to these electrochemical storages. In this way there can be accomplished in steps as uniform as possible charging of all of the individual electrochemical storages.

In the case of four batteries, each of which exhibit a potential or voltage of 60 volts at a maximum charging state and the end consumer or load circuit is connected in series, it was possible to obtain during charging a saving in energy of 9% in contrast to the conventional technique, and specifically, the measurement of the energy delivered to the electrochemical storages. There was also possible a 14% increase of the energy supply of the series connected batteries. This energy saving can be explained in terms of the fact that there could be extensively prevented recharging phenomenon between the batteries owing to the existence of as identical as possible charging states.

When a number of batteries are connected in series, then, as previously explained, due to the stray or vagabond currents there arises recharging, and thus, separation out of undesired zinc films. Now if the batteries are connected in series in a different sequence, in other words, if, for example, at two batteries, following one or a number of charging and discharging operations, the electrodes which were connected with the consumer or load are then connected with one another, and the consumer or the charging device, respectively, connected with both of the remaining electrodes, then there can be thus achieved a change of the stray currents, and hence, dissolving of the undesired zinc film. Due to this procedure there can be increased by about 50% the time span during which the batteries are used without requiring additional maintenance or servicing work.

Suitable plastic materials which can be used both for the electrodes and also the diaphragms or separators, include, for example, polyethylene, polypropylene, polyvinylchloride or the like. A prerequisite regarding selection of the plastic materials is that such is essentially chemically inert with respect to halogens, and especially bromine. Thus, it is readily possible to use highly halogenated plastics, such as, for instance, polytetrafluoroethylene or even others. In order to obtain electrical conductivity of the electrodes, there can be imbedded in the plastic material of the electrodes different conductive particles, especially carbon particles, such as activated carbon, but also graphite and the like.

Finally, it is observed that memory alloys are well known from many different publications directed to the same and can be formed, for example, on the basis of aluminum and zinc.

While there are shown and described present preferred embodiments of the invention, it is distinctly to be understood the invention is not limited thereto, but may be otherwise variously embodied and practiced within the scope of the following claims.

What is claimed is:

1. A method of charging a multiplicity of electrochemical storages, comprising the steps of:
   at least periodically infeeding and outfeeding in a hydraulic parallel circuit aqueous electrolyte liquids to and from individual anode and cathode spaces of each storage;

charging each storage in order to separate at the cathode a layer of metallic zinc and at the anode bromine which is converted by a complex former dissolved in aqueous electrolyte into a complex which is essentially insoluble in water containing a complex former dissolved in aqueous electrolyte;

determining, during the charging operation, at predetermined time intervals the charging state of each of the electrochemical storages;

upon reaching a predetermined value of the charging state of a given electrochemical storage, interrupting the charging operation thereof; and decreasing the predetermined time intervals in length as the charging state of each of the electrochemical storages increases.

2. The method according to claim 1, further including the step of:
using cells as the electrochemical storages.

3. The method according to claim 1, further including the step of:
using cell stacks as the electrochemical storages.

4. The method according to claim 1, further including the step of:
using batteries as the electrochemical storages.

5. The method according to claim 1, wherein:
the step of at least periodically infeeding and outfeeding aqueous electrolyte liquids entails continuously infeeding and outfeeding aqueous electrolyte liquids in a hydraulic parallel circuit to individual anode and cathode spaces of each storage.

6. The method according to claim 1, further including the step of:
electrically connecting in parallel the storages during the charging operation; and
providing means for separately disconnecting each storage from the charging operation.

7. The method according to claim 1, further including the step of:
performing voltage measurements at the individual storages in order to determine the charging state of each storage.

8. The method according to claim 1, further including the step of:
carrying out charging of the storages by using a common primary winding of an electrical transformer having a plurality of secondary windings provided with rectifiers, and each of which secondary windings is operatively connected with an associated storage.

9. The method according to claim 1, wherein the step of:
determining the charging state of each storage entails first interrupting an electrical connection between a charging current source for all of the storages; and
then determining the charging state of each storage.

10. The method according to claim 9, wherein:
the step of interrupting an electrical connection between a charging current source for all of the storages is accomplished by activating respective switches.

11. The method according to claim 1, further including the step of:
maintaining in circulation the electrolytic liquids during the determination of the charging state of each storage.

12. A method of charging a multiplicity of electrochemical storages, comprising the steps of:

at least periodically infeeding and outfeeding in a hydraulic parallel circuit aqueous electrolyte liquids to and from individual anode and cathode spaces of each storage;

charging each storage in order to separate at the cathode a layer of metallic zinc and at the anode bromine which is converted by a complex former dissolved in aqueous electrolyte into a complex which is essentially insoluble in water containing a complex former dissolved in aqueous electrolyte;

determining, during the charging operation, at predetermined time intervals the charging state of each of the electrochemical storages; and upon reaching a predetermined value of the charging state of a given electrochemical storage, interrupting the charging operation thereof;

the step of determining the charging state of each storage entailing first interrupting an electrical connection between a charging current source for all of the storages and then determining the charging state of each storage;

the step of interrupting an electrical connection between a charging current source for all of the storages being accomplished by activating respective switches; the method further including the step of:
using for each of the respective switches a switch having different selective operating positions for selectively electrically connecting the storages in series or parallel.

13. A method of charging a multiplicity of electrochemical storages, comprising the steps of:

at least periodically infeeding and outfeeding in a hydraulic parallel circuit aqueous electrolyte liquids to and from individual anode and cathode spaces of each storage;

charging each storage in order to separate at the cathode a layer of metallic zinc and at the anode bromine which is converted by a complex former dissolved in aqueous electrolyte into a complex which is essentially insoluble in water containing a complex former dissolved in aqueous electrolyte;

determining, during the charging operation, at predetermined time intervals the charging state of each of the electrochemical storages; and upon reaching a predetermined value of the charging state of a given electrochemical storage, interrupting the charging operation thereof;

Wherein the step of determining entails measuring a potential of one or more of the electrochemical storages and determining if a measured potential exceeds 5 percent of an arithmetic mean of potentials of all the electrochemical storages; and wherein the step of interrupting entails interrupting the charging operation of each electrochemical storage that has a measured potential that exceeds 5 percent of the arithmetic mean of potentials of all the electrochemical storages.

14. A method of charging a multiplicity of electrochemical storages, comprising the steps of:

at least periodically infeeding and outfeeding in a hydraulic parallel circuit aqueous electrolyte liquids to and from individual anode and cathode spaces of each storage;

charging each storage in order to separate at the cathode a layer of metallic zinc and at the anode bromine which is converted by a complex former dissolved aqueous electrolyte into a complex which is essentially insoluble in water containing a complex former dissolved in aqueous electrolyte;

determining, during the charging operation, at predetermined time intervals the charging state of each of the electrochemical storages; and upon reaching a predetermined value of the charging state of a given electrochemical storage, interrupting the charging operation thereof;

the step of determining the charging state of each storage entailing first interrupting an electrical connection between a charging current source for all of the storages and then determining the charging state of each storage;

the step of interrupting an electrical connection between a charging current source for all of the storages being accomplished by activating respective switches;

each of the respective switches a memory metal; and the step of activating each of the respective switches heating the memory metal.

15. The method according to claim 14, wherein:
the step of heating entails electrically heating the memory metal.

16. A method of charging a multiplicity of electrochemical storages, comprising the steps of:
at least periodically infeeding and outfeeding in a hydraulic parallel circuit aqueous electrolyte liquids to and from individual anode and cathode spaces of each storage;

charging each storage in order to separate at the cathode a layer of metallic zinc and at the anode bromine which is converted by a complex former dissolved in aqueous electrolyte into a complex which is essentially insoluble in water containing a complex former dissolved in aqueous electrolyte;

determining, during the charging operation, at predetermined time intervals the charging state of each of the electrochemical storages;

upon reaching a predetermined value of the charging state of a given electrochemical storage interrupting the charging operation thereof;

connecting the storages in series; and altering the sequence of the series connection of the storages.

17. The method according to claim 16, wherein:
the step of altering the sequence of the series connection of the storages entails connecting together electrical infeed and outfeed lines of the storages, which were previously connected with an electrical load, and connecting other electrical infeed and outfeed lines of the storages, which were previously connected to each other, with the electrical load.

18. The method according to claim 17, wherein:
the step of altering the sequence of the series connection of the storages, entails connecting with one another electrical infeed and outfeed lines previously connected with a current source and connecting other electrical infeed and outfeed lines previously connected with one another with the current.

19. A method of charging a multiplicity of electrochemical storages, in particular cells, cell stacks, and batteries, wherein at each storage there is at least periodically infed to and outfed from individual anode and cathode spaces of each storage, in a hydraulic parallel circuit, aqueous electrolyte liquids, and during charging of the storages there is separated at the cathode metallic zinc as a layer and at the anode bromine which is converted by a complex former dissolved in aqueous electrolyte into a complex which is essentially insoluble in water, each electrolyte liquid being provided with a separate circuit and separate supply container and pump means, the improvement comprising the steps of:
determining, during the charging operation, at predetermined time intervals the charging state of each of the electrochemical storages;

upon reaching a predetermined value of the charging state of a given electrochemical storage interrupting the charging operation thereof; and decreasing the predetermined time intervals in length as the charging state of each of the electrochemical storages increases.

* * * * *